(12) United States Patent
Bower et al.

(10) Patent No.: US 6,785,088 B2
(45) Date of Patent: Aug. 31, 2004

(54) HEAD POSITIONER APPARATUS FOR DATA STORAGE AND RETRIEVAL

(75) Inventors: Bruce Bower, Williamsport, PA (US); John Staron, Montoursville, PA (US)

(73) Assignee: QorTek, Inc., Williamsport, PA (US)

( * ) Notice: Subject to any disclaimer, the term of this patent is extended or adjusted under 35 U.S.C. 154(b) by 426 days.

(21) Appl. No.: 10/054,098

(22) Filed: Jan. 22, 2002

(65) Prior Publication Data

US 2002/0097520 A1 Jul. 25, 2002

Related U.S. Application Data

(60) Provisional application No. 60/263,893, filed on Jan. 24, 2001.

(51) Int. Cl.[7] .......................... G11B 5/596; G11B 21/08; G11B 5/55
(52) U.S. Cl. ............................. 360/78.12; 360/266.2
(58) Field of Search ............................ 360/75, 78.04, 360/78.05, 78.12, 266.2, 266.5, 267.8, 266, 266.1

(56) References Cited

U.S. PATENT DOCUMENTS

| 5,761,005 | A |   | 6/1998  | McKay et al. |           |
|-----------|---|---|---------|--------------|-----------|
| 5,808,981 | A | * | 9/1998  | Suzuki       | 369/44.28 |
| 5,841,610 | A |   | 11/1998 | Battu et al. |           |
| 6,078,471 | A | * | 6/2000  | Fiske        | 360/254.2 |
| 6,078,476 | A |   | 6/2000  | Magee et al. |           |
| 6,203,968 | B1| * | 3/2001  | Igarashi     | 430/320   |
| 6,259,584 | B1|   | 7/2001  | Cini et al.  |           |

* cited by examiner

*Primary Examiner*—David Hudspeth
*Assistant Examiner*—Jason Olson
(74) *Attorney, Agent, or Firm*—Michael G. Crilly, Esq.

(57) ABSTRACT

A head positioner is described wherein a read/write head is slidably propelled along an arm by an electrically, an acoustically, or an magnetically active material. One embodiment is comprised of a driver arm with a single slidable positioner. The driver arm is composed of a rail with two driver layers. An isolator layer between rail and each driver layer prevents distortion of rail when driver layers are activated. A wear-resistant, low-friction layer prevents damage to driver layer and facilitates sliding motion between positioner and driver arm. Positioner is propelled along driver arm by energizing driver layer composed of either a piezoelectric, piezoceramic, electrostatic, electromagnetic, or electrostatic material. At least one read/write head is attached to the positioner for data communication purposes with a storage element. In an alternate embodiment, two positioners are separately and independently slidable along a single driver arm.

20 Claims, 4 Drawing Sheets

HEAD POSITIONER APPARATUS FOR DATA STORAGE AND RETRIEVAL

This application claims the benefit of Provisional App. No. 60/263,893 filed Jan. 24, 2001.

BACKGROUND OF THE INVENTION

1. Field of the Invention

The present invention generally relates to an apparatus for data storage and retrieval. Specifically, the invention is an apparatus for moving and positioning a read/write head relative to the surface of a storage element.

2. Background

Advances in computer hardware continue to increase storage capacity of optical-based and magnetic-based media and to minimize shock and vibration effects impeding data storage and retrieval. However, little progress has been realized in terms of reducing the time interval required to move a read/write head from its original location and to position it above a new location along a storage element for the purpose of writing and retrieving data.

Head movement and positioning is traditionally performed via a mechanically controlled arm having one or more read/write heads. For example, Battu et al., U.S. Pat. No. 5,841,610, describes a positioning device comprising a mechanical arm rotatably controlled by voice coil motor. McKay et al., U.S. Pat. No. 5,761,005, describes a positioning device comprising a mechanical arm linearly extendible by motor. Both inventions are inherently slow, since each requires the mechanical movement of a relatively large arm above a storage element, specifically a magnetic disk or platter.

Active materials, one example being a piezoelectric, mechanically distort or resonate when energized. While traditional piezoelectric materials facilitate rapid movement, such movement is coarse and therefore not compatible with head positioning over a large area. However, piezo-based actuators capable of micro-positioning are described in the related arts. Magee et al., U.S. Pat. No. 6,078,476, describes an improved rotating mechanical arm driven by a voice coil motor wherein a read/write head is accurately positioned via micro-actuators attached to the arm Cini et al., U.S. Pat. No. 6,259,584, describes and claims a rotatable micro-positioning device attachable to a mechanical arm. Fiske, U.S. Pat. No. 6,078,471, describes a fixed length head array movably positioned above a platter via an actuator.

High-bandwidth piezoelectric, piezoceramic, electrostrictive, magnetostrictive, and electrostatic materials are both sufficiently robust to move and sufficiently precise to position a read/write head. The application of such materials along the length of a head positioner apparatus offers the unique capability of both rapid and controlled movement of a read/write head, rather than the mechanical movement of a read/write head attached to a large arm as described in Battu et al., McKay et al., Magee et al., and Cini et al. Furthermore, high-bandwidth materials enable both rapid and precise movement, yet provide the flexible positioning of one or more read/write heads lacking in Fiske.

It is therefore an object of the present invention to avoid the disadvantages of the related art. More particularly, it is an object of the invention to provide a head positioner apparatus decreasing total access time of a read/write head across a storage element.

SUMMARY OF THE INVENTION

The present invention provides for the slidable movement and positioning of one or more read/write heads driven by the activation of a piezoelectric, piezoceramic, electrostrictive, magnetostrictive, or electrostatic material disposed along a rail. In this context, sliding and slidable movement of positioner along driver arm are broadly construed to include, but not limited to, continuous and near continuous contact between driver arm and positioner, as well as translational displacement with little or no contact between positioner and driver arm The invention is applicable to both magnetic and optical storage devices.

The preferred apparatus consists of a driver arm, a positioner, and at least one read/write head. Driver arm is composed of a rail having two planar guides lengthwise fixed and perpendicular to a planar cross member. An isolator layer is lengthwise attached to both planar surfaces of said cross member and is composed of a material preventing distortion of the rail when driver layer is activated. A driver layer is attached lengthwise to each isolator layer opposite of the cross member and is composed of a material that mechanically distorts or resonates, generates an electric field, or generates a magnetic field when energized. Thereafter, a wear resistant layer is attached lengthwise to each driver layer and opposite of the isolator layer. Positioner is slidably disposed along said driver arm and secured to at least one guide. Positioner is propelled along driver arm when driver layer is energized and stationary when energy is removed. At least one read/write head is fixed to the positioner for data communication purposes with a storage element.

In an alternate embodiment, a pair of positioners are independently movable along a single driver arm. Driver arm is composed of a rail having two planar guides lengthwise fixed and perpendicular to a planar cross member. An isolator layer is attached lengthwise to each side of the cross member and is composed of a material preventing distortion of the rail when driver layer is activated. A pair of driver layers is separably attached lengthwise to each isolator layer opposite of said cross member and is composed of a material that mechanically distorts or resonates, generates an electric field, or generates a magnetic field when energized. Thereafter, a wear resistant layer is separably attached lengthwise to each driver layer and opposite of the isolator layer. A pair of positioners are slidably and separately disposed along the driver arm. A positioner is movably secured to each guide comprising the rail. A positioner is propelled along the driver arm when at least one driver layer is energized and stationary when energy is removed. At least one read/write head is fixed to each positioner to access data on one or more storage elements.

The described and claimed invention facilitates rapid yet independent movement of one or more read/write heads across a storage element. The primary benefits are reduced seek time and random track access in hard drive and optical disk applications.

BRIEF DESCRIPTION OF THE DRAWINGS

The invention will now be described in more detail, by way of example only, with reference to the accompanying drawings, in which.

REFERENCE NUMERALS

Figure 1:
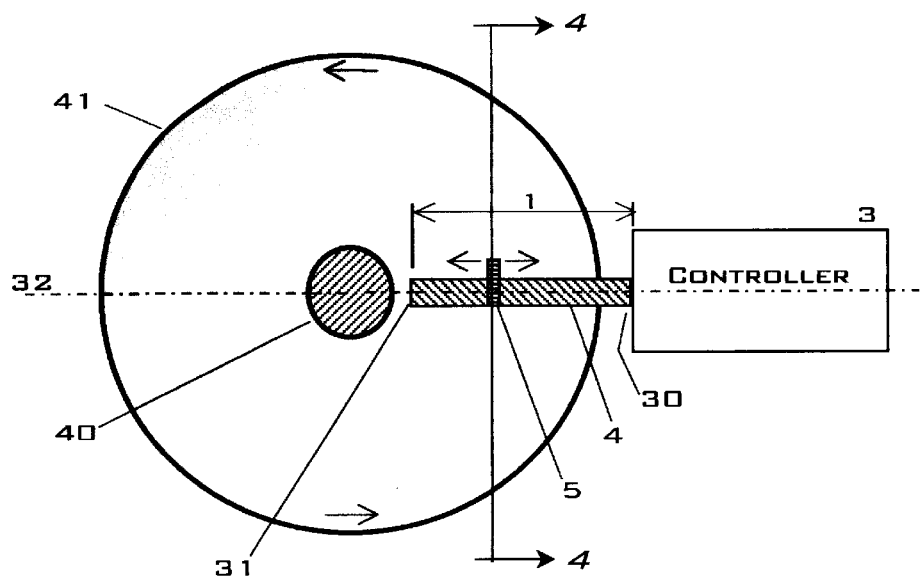
FIG. 1 is a top view of a disk drive assembly showing head positioner comprised of a driver arm with single positioner.

1 Head positioner
3 Controller
4 Driver arm
5 Positioner
6 Rail
7 Isolator layer
8 Driver layer
9 Wear resistant layer
11 Data link
12 Read/write head
20 Top
21 Bottom
22 Upper guide channel
23 Lower guide channel
24 Guide
25 Cross member
26 Sliding surface
27 Upper sliding surface
28 Lower sliding surface
30 First end
31 Second end
32 Longitudinal axis
33 Contact surface
34 Carrier
40 Hub
41 Disk

DETAILED DESCRIPTION OF THE INVENTION

FIGS. 1 through 8 describe features of the present invention. While a read/write head 12 and a controller 3 are represented as blocks, it will be understood that electronics for both components are readily understood by those skilled in the art. Furthermore, while drive and control mechanisms for the disk 41 are not shown or graphically represented, it will be understood that such mechanisms are readily understood by those skilled in the art. Finally, although connections between all referenced and described components are not shown, they too are readily understood by those skilled in the art.

Drawings are not to scale. Upper, lower, top, bottom, first and second are used for descriptive purposes only and therefore are not intended to limit the scope of the claimed invention.

Figure 2:
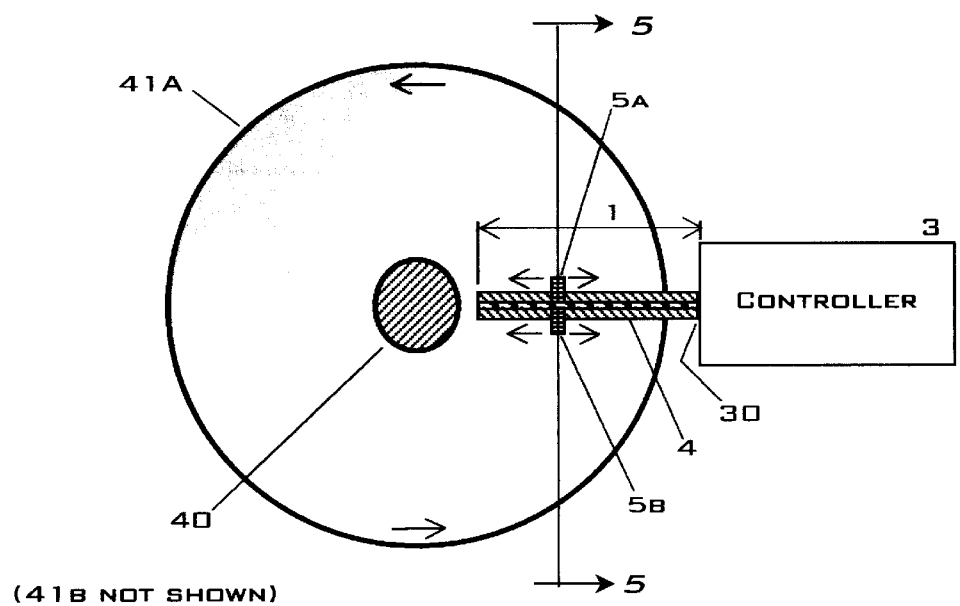
FIG. 2 is a top view of a disk drive assembly showing head positioner comprised of a driver arm with dual positioners.

FIGS. 1 and 2 show embodiments of the present invention wherein a first end 30 of a head positioner 1 is attached to a controller 3 and thereby cantilevered above a disk 41 rotating about a hub 40. An alternate embodiment may include the rigid attachment of a second end 31 of the head positioner1 to a fixed structure adjacent to the disk 41 thereby further preventing deflection. In yet another embodiment, the head positioner 1 may be rotationally or linearly movable via a motor or similar device known within the art.

The head positioner 1 is composed of a driver arm 4 and a positioner 5. FIG. 1 describes a single positioner 5 slidably disposed along the length of a single driver arm 4, as represented by arrows parallel to the driver arm 4. FIG. 2 describes a dual positioner 5 arrangement slidably disposed, however independently movable, along the length of a single driver arm 4, as presented by a pair of arrows parallel to the driver arm 4. While a linear driver arm 4 is described in both Figures, curved, spiral, and circular embodiments are possible. The preferred driver arm 4 is linear of sufficient length to position a read/write head 12 across the radius of a disk 41. However, an alternate embodiment would include a driver arm 4 of sufficient length to position a read/write head 12 across the diameter of a disk 41.

Figure 3:
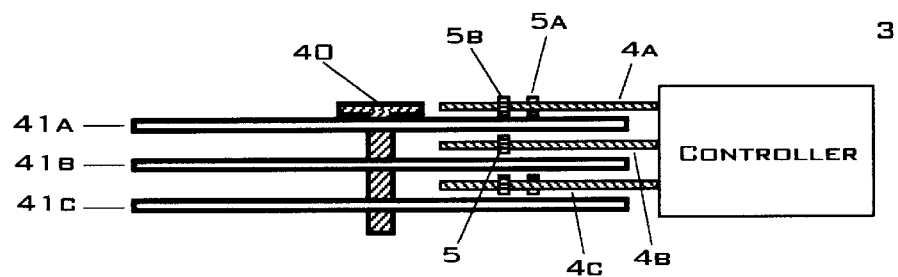
FIG. 3 is a side view of a multi-disk arrangement with both single and dual positioners.

FIG. 3 shows a typical multi-disk 41 arrangement consisting of three driver arms 4 moving a plurality of positioners 5 to access data from several disks 41. At least one read/write head 12 is mounted onto each positioner 5 so to facilitate the communication of data to and from the disk 41. However, two or more read/write heads 12 may be attached to a positioner 5 so to enable data communication with two disks 41. A controller 3 insures proper alignment of positioner 5 with respect to tracks along a rotating disk 41. One or more controllers 3 may be required to drive two or more head positioners 1.

Figure 4:
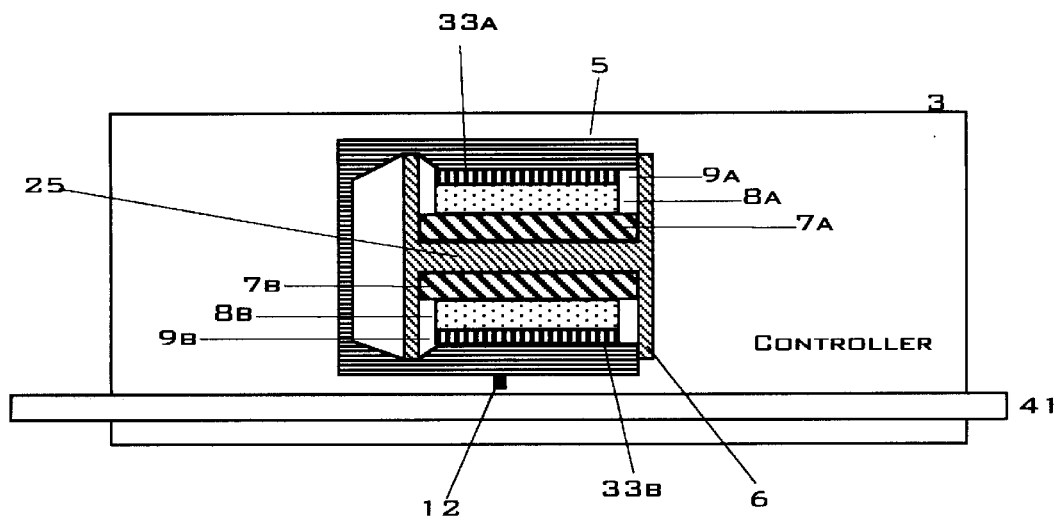
FIG. 4 is a section view of head positioner apparatus showing a single positioner and driver arm.

FIG. 4 shows a detailed view of driver arm 4 and single positioner 5 embodiment. Driver arm 4 is further comprised of a rail 6, at least one isolator layer 7, at least one driver layer 8, and at least one wear resistant layer 9. Typically, isolator layer 7, driver layer 8, and wear resistant layer 9 are each oriented in pairs along the longitudinal axis 32 of the rail 6 about the cross member 25. For example, in FIG. 4 a pair of isolator layers 7A, 7B are attached to the rail 6, thereafter a driver layer 8A, 8B is attached to each isolator layer 7A, 7B, and thereafter a wear resistant layer 9A, 9B is attached to each driver layer 8A, 8B. Isolator 7A, 7B, driver 8A, 8B, and wear resistant 9A, 9B layers are lengthwise uniform in thickness wherein thickness is application dependent. However, thickness may vary between layers. Isolator layers 7A, 7B may completely traverse the width of the cross member 25 and contact guides 24 comprising the rail 6. Preferably, driver layers 8A, 8B and wear resistant layers 9A, 9B only partially traverse the width of the cross member 25 thereby preventing their communication with the rail 6 and avoiding its distortion when one or both driver layers 8A, 8B are energized.

Figure 5:
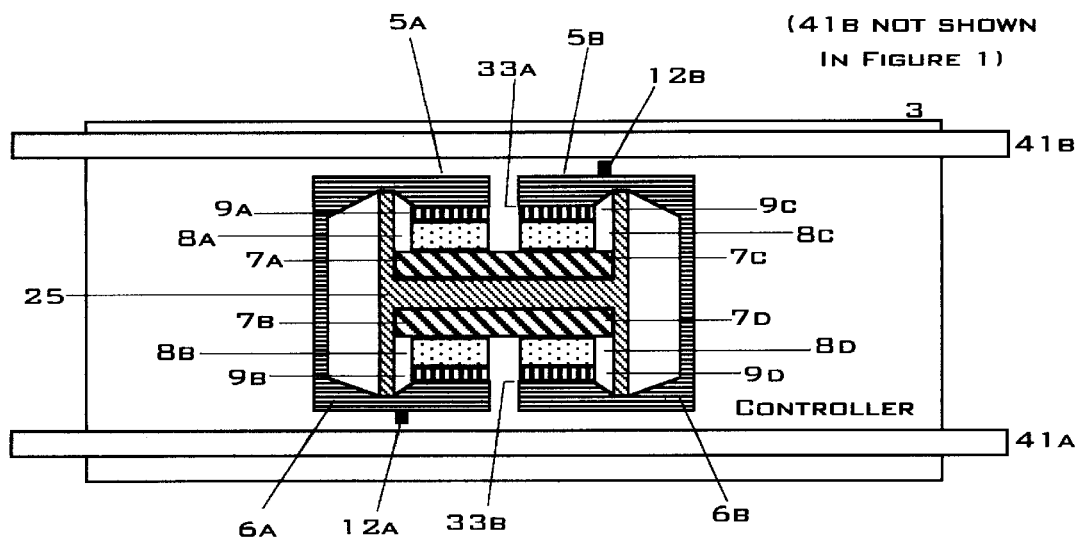
FIG. 5 is a section view of head positioner apparatus showing dual positioners and drive arm.

FIG. 5 shows a detailed view of driver arm 4 and dual positioner 5A, 5B embodiment. Driver arm 4 is further comprised of a single rail 6, at least one isolator layer 7A, 7B, at least one paired driver layer 8A–8C, 8B–8D, and at least one paired wear resistant layer 9A–9C, 9B–9D. Typically, isolator layer 7A, 7B, paired driver layer 8A–8C, 8B–8D, and paired wear resistant layer 9A–9C, 9B–9D are each oriented in pairs along the longitudinal axis 32 of the rail 6 about the cross member 25. For example, in FIG. 5 a pair of isolator layers 7A, 7B are attached to the rail 6, thereafter a paired driver layer 8A–8C or 8B–8D is attached to each isolator layer 7A, 7B, and thereafter a wear resistant layer 9A, 9B, 9C, 9D is attached to each driver layer 8A, 8B, 8C, 8D. Isolator 7A, 7B, driver 8A, 8B, 8C, 8D, and wear resistant 9A, 9B, 9C, 9D layers are lengthwise uniform in thickness wherein thickness is application dependent. However, thickness may vary between layers. Both isolator layers 7A, 7B may completely traverse the width of the cross member 25 and contact guides 24 comprising the rail 6. Preferably, driver layers 8A, 8B, 8C, 8D and wear resistant layer 9A, 9B, 9C, 9D partially traverse the width of the cross member 25 thereby preventing distortion of rail 6 when one or more driver layers 8A, 8B, 8C, 8D are energized. The paired arrangement of driver layers 8A–8C, 8B–8D and wear resistant layers 9A–9C, 9B–9D provides a functional separation that facilitates the activation of driver layer 8A independent of driver layer 8C and driver layer 8B independent of driver layer 8D.

Figure 7:
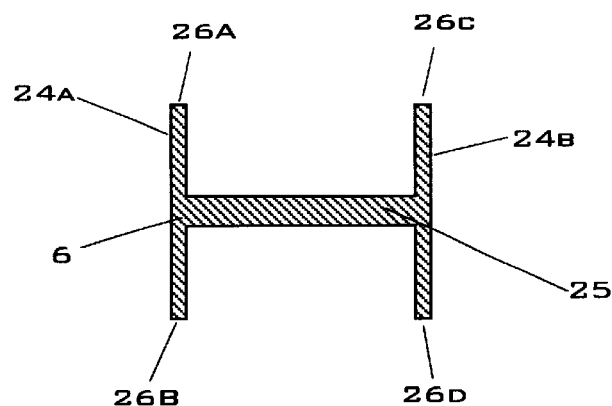
FIG. 7 is a section view of a rail.

A rail 6 is a structurally rigid substructure of the driver arm 4 typically composed of either a metal, a composite, a polymer, or combinations thereof supporting positioner 5 above disk 41 thereby preventing damage to disk 41 yet facilitating data communication. While various rail 6 cross sections are possible, an H-shaped rail 6 is shown in FIG. 7 consisting of a pair of guides 24 fixed and perpendicular to a single cross member 25. In the preferred embodiment, guides 24 and cross member 25 are constant thickness and planar.

An isolator layer 7 is composed of a viscoelastic material with sufficient elastic and damping properties to prevent distortion of rail 6 when driver layer 8 is activated. The preferred embodiment is composed of a non-conducting, viscoelastic material. Each isolator layer 7 is fixed to both rail 6 and driver layer 8 via techniques known within the art.

A driver layer 8 propels positioner 5 along the driver arm 4 when energized by electric, acoustical or magnetic energy. A typical driver layer 8 is composed of either a piezoelectric, a piezoceramic, an electrostrictive, a magnetostrictive, or an electrostatic material. Piezoelectric and piezoceramic materials may be arranged in planar oriented stacks either perpendicular or parallel to the cross member 25. Each driver layer 8 is attached to both isolator layer 7 and wear resistant layer 9 via techniques known within the art.

A wear resistant layer 9 minimizes frictional wear and facilitates sliding along the contact surface 33 between wear resistant layer 9 and both upper sliding surface 27 and lower sliding surface 28 of positioner 5. Preferably, the wear resistant layer 9 is comprised of a low-friction, pliable polymer. The most preferred is a controlled-friction thin film applied via vapor deposition or sputtering techniques.

Figure 6:
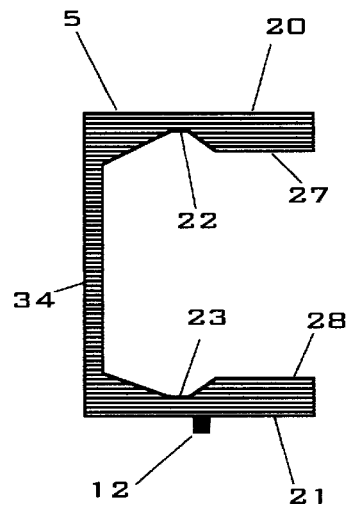
FIG. 6 is a section view of a positioner.

A positioner 5 is composed of either a metal, a composite, a polymer, or combinations thereof. While various positioner 5 configurations are possible, a C-shaped positioner 5 is shown in FIG. 6 consisting of a carrier 34 onto which is fixed one or more read/write heads 12. Read/write heads 12 are preferably attached along either top 20 or bottom 21 or both top 20 and bottom 21 surfaces of the carrier 34.

Positioner 5 is propelled along driver arm 4 while maintaining continuous or intermittent contact with rail 6 and wear resistant layer 9. Positioner 5 motion is restricted along the longitudinal axis 32 of the rail 6 by an upper guide channel 22 and a lower guide channel 23 each directly contacting sliding surfaces 26A–26B or 26C–26D along guides 24A or 24B comprising the rail 6. A hard wear resistant thin-film is applied along the upper guide channel 22, lower guide channel 23, and sliding surfaces 26A, 26B, 26C, 26D to prevent surface wear. Example thin films include silicon carbide, silicon nitride, diamond and diamond-like materials. Such thin films may be applied via vapor deposition or sputtering. Positioner 5 movement is achieved by the controlled interaction along a contact surface 33 between upper sliding surface 27 and wear resistant layer 9A or 9C and between lower sliding surface 28 and wear resistant layer 9B or 9D.

Controller 3 regulates energy flow to the driver layer 8 which in turn moves the positioner 5 along the driver arm 4. In one embodiment, the controller 3 input to the driver layer 8 consists of an electrostatic charge. In another embodiment, the controller 3 input to the driver layer 8 is electromagnetic charge. In the preferred embodiment, the controller 3 input is an acoustic wave communicated to the driver layer 8 thereby resonating driver material. Electrostatic, electromagnetic, and acoustic generators are readily understood in the art.

Positioning of read/write head 12 with respect to data tracks along the disk 41 is regulated by the controller 3. For example, the controller 3 recognizes the current global position value of a read/write head 12 along a driver arm 4 and compares the value to the global position of one or more target tracks along the disk 41. Piezoelectric elements along one side of the cross member 25, for example driver layer 8A, are energized to propel read/write head 12 towards a target track. Whereas piezoelectric elements along the opposite side of the cross member 25, in this example driver layer 8B, are energized to propel the read/write head 12 away from the target track. In an alternate embodiment, a read/write head 12 is attached to a micro-actuator and thereafter fixed to positioner 5 thereby providing further alignment fidelity.

Acoustic induced motion of a positioner 5 along a driver arm 4 is best described as a series of rapidly alternating stick-slip events. During the stick event, there is momentary contact between positioner 5 and wear resistant element 9 along the contact surface 33. During the slip event, positioner 5 slides over the wear resistant element 9 along the contact surface 33. Position fidelity, between read/write head 12 and tracks comprising the disk 41, is optimized by maximizing the number of stick/slip pairs along a per unit length of driver arm 4. Positioner 5 motion ends when acoustic traveling waves cease.

Two embodiments are possible for generating such acoustic waves. In the first such embodiment, a piezoelectric motor within the controller 3 transmits a resonant mode wave in either a first or third overtone into the driver layer 8. In the second embodiment, an interdigitized SAW piezo-element is attached along the length of the driver arm 4 and preferably within the driver layer 8. Positioner 5 movement results when a traveling wave is produced along the driver layer 8.

Non-constant force motion is achieved with electrostatic and electromagnetic driven movement of positioner 5. Electrostatic movement is achieved by rapidly switching an electrostatic charge along the driver layer 8. Electromagnetic movement is achieved by rapidly switching a magnetic field along the driver layer 8. In both instances, carrier 34 may be locally levitated with respect to wear resistant layer 9 thereby reducing frictional wear along the driver arm 4 that might result with positioner 5 movement. Position fidelity, between read/write head 12 and tracks comprising the disk 41, is optimized by maximizing switching frequency.

Figure 8:
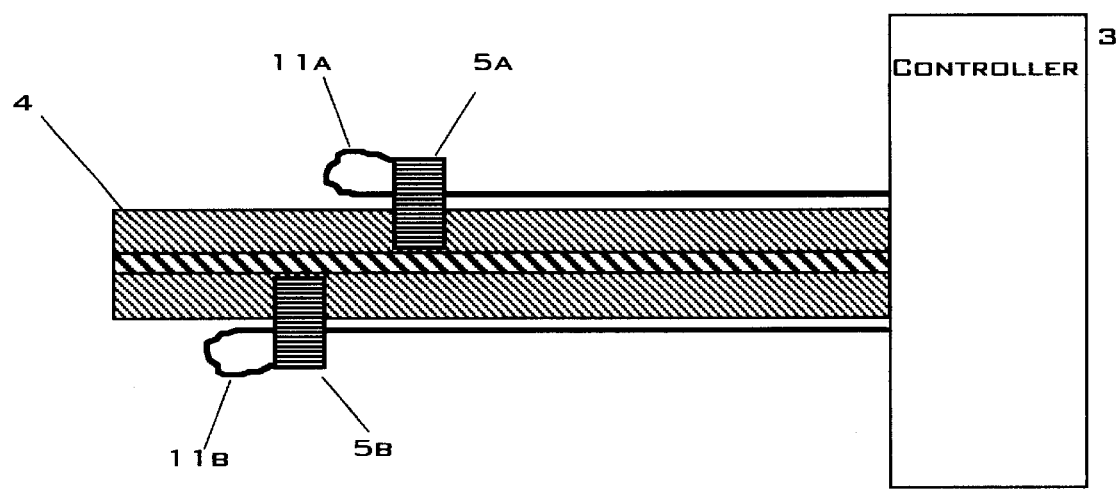
FIG. 8 is a top view of head positioner and controller with wire-based data link.

Data is communicated to and retrieved from a disk 41 via one or more read/write head 12 fixed to the carrier 34. Read/write heads 12 suitable for either magnetic or optical storage devices are known in the art. Data is transmitted to and from a read/write head 12 via a data link 11. FIG. 8 shows a conventional wire-based data link 11, although wireless infrared and laser based systems known within the art are also adaptable to this application.

The description above indicates that a great degree of flexibility is offered in terms of the apparatus. Although the present invention has been described in considerable detail with reference to certain preferred versions thereof, other versions are possible. Therefore, the spirit and scope of the appended claims should not be limited to the description of the preferred versions contained herein.

What is claimed is:

1. A head positioner for data storage to and retrieval from at least one storage element, said head positioner comprising:
   (a) a driver arm having a rigid substructure, at least one isolator layer attached lengthwise to said rigid substructure, a driver layer attached lengthwise to said isolator layer opposite of said rigid substructure, said driver layer activated when energized, said isolator layer preventing distortion of said rigid substructure when said driver layer is activated, a wear resistant layer attached lengthwise to said driver layer opposite of said isolator layer;
   (b) a positioner slidably disposed along said driver arm, said driver layer moving said positioner along said driver arm; and
   (c) at least one read/write head attached to said positioner.

2. The head positioner in claim 1, wherein said isolator layer is comprised of a non-conducting, viscoelastic polymer.

3. The head positioner in claim 1, wherein said wear resistant layer is comprised of a low friction polymer.

4. The head positioner in claim 1, wherein said driver payer is comprised of a piezoelectric material.

5. The head positioner in claim 1, wherein said driver layer is comprised of a piezoceramic material.

6. The head positioner in claim 1, wherein said driver layer is comprised of an electrostrictive material.

7. The head positioner in claim 1, wherein said driver layer is comprised of a magnetostrictive material.

8. The head positioner in claim 1, wherein said driver layer is comprised of an electrostatic material.

9. The head positioner in claim 1, further comprising a micro-actuator attached to said positioner, said micro-actuator actively aligning said read/write head with said storage element.

10. The head positioner in claim 1, wherein said driver arm is movable across said storage element.

11. A head positioner for data storage to and retrieval from at least one storage element, said head positioner comprising:
   (a) a driver arm having a rigid substructure, at least one isolator layer attached lengthwise to said rigid substructure, a paired driver layer separately attached lengthwise to said isolator layer opposite of said rigid substructure, said paired driver layer separately activated when energized, said isolator layer preventing distortion of said rigid substructure when said paired driver layer is separately activated, a paired wear resistant layer attached lengthwise to said paired driver layer opposite of said isolator layer;
   (b) two positioners slidably disposed along said driver arm, said paired driver layer separately moving said positioners along said driver arm; and
   (c) at least one read/write head fixed to each of said positioners.

12. The head positioner in claim 11, wherein said isolator layer is comprised of a non-conducting, viscoelastic polymer.

13. The head positioner in claim 11, wherein said paired wear resistant layer is comprised of a low friction polymer.

14. The head positioner in claim 11, wherein said paired driver payer is comprised of a piezoelectric material.

15. The head positioner in claim 11, wherein said paired driver layer is comprised of a piezoceramic material.

16. The head positioner in claim 11, wherein said paired driver layer is comprised of an electrostrictive material.

17. The head positioner in claim 11, wherein said paired drive layer is comprised of a magnetostrictive material.

18. The head positioner in claim 11, wherein said paired drive layer is comprised of a electrostatic material.

19. The head positioner in claim 11, further comprising a micro-actuator attached to said positioner, said micro-actuator actively aligning said read/write head with said storage element.

20. The head positioner in claim 11, wherein said driver arm is movable across said storage element.

* * * * *

UNITED STATES PATENT AND TRADEMARK OFFICE
CERTIFICATE OF CORRECTION

PATENT NO. : 6,785,088 B2
DATED : August 31, 2004
INVENTOR(S) : Bower et al.

It is certified that error appears in the above-identified patent and that said Letters Patent is hereby corrected as shown below:

Title page,
Item [57], ABSTRACT,
Line 3, delete "an"
Line 3, insert -- a --

Column 1,
Line 42, insert -- . -- after "arm"

Column 3,
Line 61, insert -- -- after "positioner"

Column 7,
Line 24, delete "payer", insert -- layer --

Column 8,
Line 24, delete "payer", insert -- layer --
Line 33, delete "a", insert -- an --

Signed and Sealed this

Sixteenth Day of November, 2004

JON W. DUDAS
*Director of the United States Patent and Trademark Office*